United States Patent [19]

Ichinose

[11] 4,071,807
[45] Jan. 31, 1978

[54] FLUORESCENT LAMP LIGHTING DEVICE

[76] Inventor: Yoshinobu Ichinose, No. 4-8, 5-chome, Soshigaya, Setagaya, Tokyo, Japan

[21] Appl. No.: 733,302

[22] Filed: Oct. 18, 1976

[30] Foreign Application Priority Data

Aug. 13, 1976 Japan .................................. 51-96853

[51] Int. Cl.² .......................... H05B 41/29; H03K 3/28
[52] U.S. Cl. ........................................ 315/219; 315/98;
 315/101; 315/105; 315/221; 315/DIG. 7
[58] Field of Search ................... 315/97, 98, 101, 105,
 315/209 R, 219, 221, DIG. 7

[56] References Cited

U.S. PATENT DOCUMENTS

| | | | |
|---|---|---|---|
| 3,629,648 | 12/1971 | Brown et al. | 315/221 X |
| 3,869,640 | 3/1975 | Kolomyjec | 315/97 |
| 3,882,354 | 5/1975 | May | 315/DIG. 7 |

Primary Examiner—Eugene R. LaRoche
Attorney, Agent, or Firm—Stevens, Davis, Miller & Mosher

[57] ABSTRACT

A fluorescent lamp lighting device comprises a d.c. power source, a transistor, a transformer and a fluorescent lamp. The d.c. power source is connected in series with the primary winding of the transformer between a first electrode and a second electrode of the transistor. The fluorescent lamp has one filament connected to one end of a first secondary winding of the transformer. A second secondary winding of the transformer is connected between the other end of the first secondary winding of the transformer and the junction of the d.c. power source and the primary winding of the transformer. The fluorescent lamp has the other filament connected between the junction of the first secondary winding of the transformer and the second secondary winding and a third electrode of the transistor.

2 Claims, 3 Drawing Figures

FLUORESCENT LAMP LIGHTING DEVICE

BACKGROUND OF THE INVENTION

1. Field of the Invention

This invention relates to a fluorescent lamp lighting device and more particularly to such a lighting device of the type in which a fluorescent lamp is lit with a d.c. power source.

2. Description of the Prior Art

Most conventional lighting equipment, for example lighting equipment of the portable type such as the so-called electric torch, are of the type utilizing a miniature electric bulb. Use is made of the SUM-1 (1.5 volts) as a unit cell in such equipment and a plurality of cells are used depending upon the desired amount of light. In recent years, fluorescent lamps have been considered and used in lighting equipment of the portable type. Problems exist however because a number of cells have to be used in the equipment, light performance peculiar to the fluorescent lamp is not efficiently utilized and the equipment cannot withstand long use. There is also the disadvantage that use of a number of cells results in bulky and heavy lighting equipment.

The main object of this invention is to provide a fluorescent lamp lighting device capable of emitting light continuously for a long period of time even with a d.c. power source of low voltage and small capacity and in particular an economic, miniature and portable fluorescent lamp lighting equipment of the lightweight type.

SUMMARY OF THE INVENTION

According to the present invention, there is provided a fluorescent lamp lighting device comprising a d.c. power source, a transistor, a transformer and a fluorescent lamp characterized in that the d.c. power source is connected in series with the primary winding of the transformer between a first electrode and a second electrode of the transistor, the fluorescent lamp has one filament connected to one end of a first secondary winding of the transformer, the second secondary winding of the transformer is connected between the other end of the first secondary winding of the transformer and the junction of the d.c. power source and the primary winding of the transformer and the fluorescent lamp has the other filament connected between the junction of the first secondary winding of the transformer and the second secondary winding and a third electrode of the transistor.

The present invention will be described in detail in connection with the preferred embodiment of the present invention illustrated in the accompanying drawings.

DESCRIPTION OF THE PREFERRED EMBODIMENTS

Prior to description of presenting a the preferred embodiment of the invention, a typical example of the portable conventional fluorescent lamp lighting equipment will be described by reference to FIGS. 1 and 2.

Figure 1:
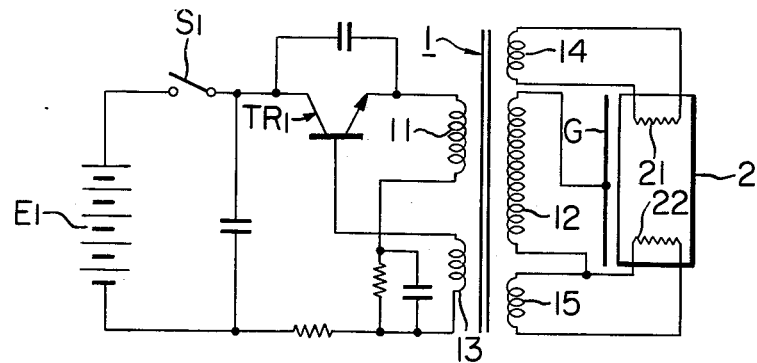
FIG. 1 illustrates a schematic electrical circuit of an example of a conventional fluorescent lamp lighting equipment.

Referring to FIG. 1 of the drawing, there is schematically shown one example of the electrical circuit of a conventional fluorescent lamp lighting equipment. In the fluorescent lamp lighting equipment illustrated, the arrangement is such that a d.c. power source E1 is connected through a switch S1 to an inverter circuit. The power source $E_1$ consists of two groups of cells connected in parallel with each other, each group consisting of five 1.5 volt cells in series. The inverter circuit includes a transistor TR1 and the primary winding 11 and the secondary windings 12, 13 of a transformer 1. The inverter circuit converts the d.c. voltage of the d.c. power source E1 into a high a.c. voltage of, for example about 6 KV and a frequency of about 4 KHz. d.c. voltage is derived from across the secondary winding 12 of the transformer 1. In close proximity to a six-watt fluorescent lamp 2 is provided a reflection plate G which acts as a grounded conductor used in a fluorescent lamp device of the rapid-starting type. The fluorescent lamp 2 has one filament 21 connected to the secondary winding 14 of the transformer 1 to be heated and another filament 22 connected to the secondary winding 15 of the transformer 1 to be heated. The secondary winding 12 of transformer 1 is connected between the reflection plate G and the filament 22 of fluorescent lamp 2. Operation of the circuit thus constructed will now be described. Upon closure of the switch S1, an a.c. voltage is induced in the secondary windings 14 and 15 of transformer 1 with the result that a current will flow in the filaments 21 and 22 of fluorescent lamp 2 which will in turn be heated. The a.c. voltage concurrently induced in secondary winding 12 of transformer 1 is applied between the filament 22 of the fluorescent lamp 2 and the reflection plate G. When thermal electrons are emitted from filaments 21 and 22 sufficiently, a small discharge begins between the filaments and the reflection plates and in a short time the discharge expands to the entire fluorescent lamp and then develops into a perfect discharge.

In the fluorescent lamp circuit as above mentioned, a considerable amount of electric energy supplied from the d.c. power source is consumed to heat the filaments of the fluorescent lamp and thus the circuit exhibits poor efficiency. In order to provide a fluorescent lamp lighting equipment fit for continuous use for a long period of time, a d.c. power source of large capacity is needed. Moreover, a voltage as high as 6 KV is also needed and it is not possible to light a fluorescent lamp by use of a d.c. power source of low voltage. As a result, as many as ten SUM-1 dry cells are needed to provide a d.c. power source for the circuit of FIG. 1 permitting (continuous lighting for a period of about six hours). There is accordingly a disadvantage in that the lighting equipment become large and heavy and its portability is not satisfactory. In addition, a high voltage of about 6 KV is applied between the reflection plate G and the filaments making the reflection plate G, which is disposed outside the fluorescent lamp, dangerous to the user.

Figure 2:
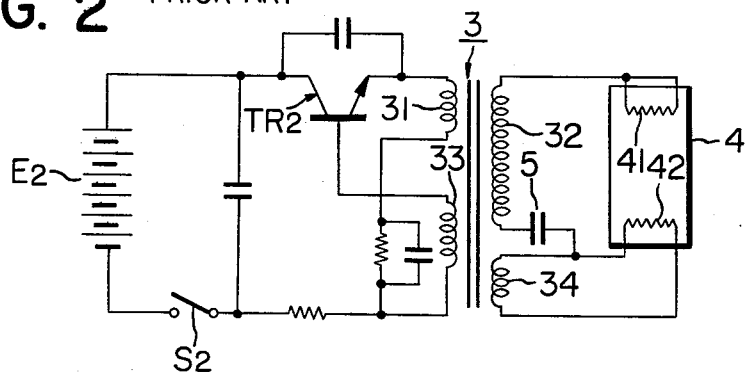
FIG. 2 illustrates a schematic electrical circuit of another example of the conventional fluorescent lamp lighting equipment.

FIG. 2 shows schematically another example of the electrical circuit of a conventional fluorescent lamp lighting equipment of portable type. In the fluorescent lamp lighting equipment illustrated, the arrangement is such that a d.c. power source E2, which is composed of a series connection of six SUM-1 dry cells each of 1.5 volts, is connected through a switch S2 to an inverter circuit. The inverter circuit includes a transistor TR2 and the primary winding 31 and the secondary windings 32 and 33 of a transformer 3 and the inverter circuit converts the d.c. voltage of the d.c. power source E2 into an a.c. voltage of, for example, about 500 volts and a frequency of about 2 KHz which is derived across the secondary winding 32 of the transformer 3. A four-watt fluorescent lamp 4 one filament 41 with both ends connected together to one end of the secondary winding 32 of transformer 3 and the other filament 42 connected across the secondary winding 34 of transformer 3 to be heated. The secondary winding 32 of transformer 3 has its other end connected through a capacitor 5 to one end of the filament 42 of the fluorescent lamp 4. Operation of the circuit thus constructed will now be described. Upon closure of the switch S2, an a.c. voltage is induced in the secondary winding 34 of transformer 3 with the result that a current will flow in the filament 42 of the fluorescent lamp 4 which will in turn be heated. The a.c. voltage concurrently induced in the secondary winding 32 of transformer 3 is applied between the filaments 41 and 42 of fluorescent lamp 4 through the capacitor 5. Due to the voltage drop across capacitor 5, the voltage applied across the filaments 41 and 42 is about 130 volts. When emission of thermal electrons from the filament 42 becomes sufficient, discharging beings between the filaments 41 and 42 with the result that the fluorescent lamp 4 will be lit. In the fluorescent lamp circuit, if the capacitor 5 is removed to minimize the voltage drop and the secondary winding 32 is directly connected at the end to the end of the filament 42, no current will be supplied to the filament 42 from the secondary winding 34 and thus the filament will not be heated and the fluorescent lamp 4 will not be lit.

Also, in the fluorescent lamp circuit as above mentioned, it is true that a considerable amount of electric energy from the d.c. power source is consumed to heat the filaments of the fluorescent lamp and thus it will have poor efficiency. In order to provide a fluorescent lamp lighting equipment fit for continuous use for a long period of time, a d.c. power source of large capacity is needed. Moreover, voltage as high as 500 V is needed and it is not possible to light a fluorescent lamp by use of a d.c. voltage of low voltage. As a result, as many as six SUM-1 dry cells are needed, as in the example of FIG. 1, to provide a d.c. power source. (In this case there can be a continuous lighting period of about three hours). There is accordingly a disadvantage in that the lighting equipment become bulky and heavy as a whole and its portability is poor.

The present invention has for its object to remove the drawbacks of the conventional fluorescent lamp lighting equipment as above mentioned and to provide a fluorescent lamp lighting device capable of lighting continuously for a long period of time even with a d.c. power source of low voltage and small capacity. In particular, it is an object to provide an economic, miniature and portable fluorescent lamp lighting equipment of light weight.

The present invention will now be described in detail in connection with one embodiment of the fluorescent lamp lighting device according to the invention by reference to FIG. 3 of the drawing.

Figure 3:
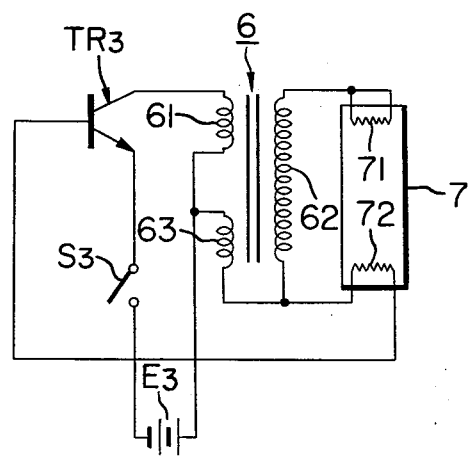
FIG. 3 illustrates a schematic electrical circuit of an embodiment of the fluorescent lamp lighting device according to the present invention.

In the portable fluorescent lamp lighting equipment according to the invention illustrated in FIG. 3, a d.c. power source E3 composed of two SUM-1 dry cells each of 1.5 volts connected in series with each other is connected in series with the primary winding 61 of a transformer 6 through a switch S3 between the collector electrode and the emitter electrode of a transistor TR3. A six-watt fluorescent lamp 7 has both ends of one filament 71 connected at both ends together to one end of the secondary winding 62 of the transformer 6. The secondary winding 63 of transformer 6 is connected between the junction of the primary winding 61 of transformer 6 and the positive plate of the d.c. power source E3 and the other end of the secondary winding 62 of the transformer 6. The fluorescent lamp 7 has the other filament 72 connected between the junction of other end of the secondary winding 62 of transformer 6 and the end of the secondary winding 63 and the base electrode of transistor TR3. It could be said that the inverter circuit is composed of the transistor TR3, the primary winding 61, the secondary windings 62 and 63 and the filament 72 of the fluorescent lamp 7. The inverter circuit serves to convert the d.c. voltage of the d.c. power source E3 into an a.c voltage. It is preferred that various constants of the components used in the inverter circuit be selected to derive a.c. voltage having a frequency of about 2 KHz and about 130 volts across the secondary winding 62 of transformer 6 and to provide a current of about 1.1 A flowing in the primary winding 61 of transformer 6, a current of about 15 mA flowing in the secondary winding 62 and a current of about 50 mA flowing in the filament 72 at a voltage of about 8 volts across the filament 72. It is to be noted that a current large enough to permit emission of thermal electrons does not flow in the filament 72 of the fluorescent lamp 7 in the lighting circuit, but the filament is used as a load resistor in the base of transistor TR3 or a resistor for voltage drop. In other words, in the lighting circuit, the filament 72 allows only a small current to flow therein and is not heated as heater but used merely as an element constituting a part of the inverter circuit.

With the circuit arrangement as above mentioned, the secondary winding 62 of transformer 6 can be coupled between the filaments of the fluorescent lamp 7 without a capacitor or the like and without an accompanying voltage drop as in the circuit of FIG. 2. Accordingly, it is only necessary to induce a low voltage (about 130 volts) across the secondary winding 62 to enable electrons to be emitted from the filament 71 towards the filament 72 with the result that the fluorescent lamp 7 is lit. There is no need for a large current to flow in the filaments of fluorescent lamp 7 which current will heat the filaments as a heater and therefore less electrical energy from the d.c. power source is consumed. It is therefore possible to light the fluorescent lamp with a d.c. power source of as low voltage as 3 volts and moreover for a long time continuously with d.c. power source of small capacity. In the embodiment described above and illustrated in FIG. 3, it is possible to light a six-watt fluorescent lamp for about five hours (normally about two hours with the use of ordinary SUM-1 dry cells) continuously with the use of two alkaline SUM-1 dry cells each of 1.5 volts.

An explanation has been given of the lighting of a six-watt fluorescent lamp by way of the embodiment as above mentioned, and it is also possible to light 8-watt or 4-watt fluorescent lamps by means of the same circuit arrangement as above described. It is also to be noted that a d.c. power source of any voltage value ranging from about 1.5 volts to 3 volts may be used.

As seen from the foregoing, it is possible with the structure of the present invention to make the d.c. voltage quite small and light and thus to provide a miniature, light and economical fluorescent lamp lighting device. It is also possible to provide a lighting device suitable for portability. In addition, use of the filament of a fluorescent lamp as a components of an inverter circuit is effective to reduce the number of components of the lighting circuit.

I claim:

1. Apparatus for energizing a fluorescent lamp having a pair of filaments, each having first and second ends, from a d.c. power source comprising
    a transistor having first, second and third electrodes,
    a transformer including a primary winding having one end connected to the first electrode of said transistor and the other coupled through said d.c. power source to the second electrode of said transistor, a first secondary winding having one end connected to the first and second ends of one of the filaments of said fluorescent lamp and the other end connected directly to the first end of the other filament of said fluorescent lamp, and a second secondary winding connected between the other ends of said primary and first secondary windings, and
    means coupling the second end of the other filament of said fluorescent lamp to the third electrode of said transistor.

2. A fluorescent lamp lighting device as set forth in claim 1 wherein the first electrode of said transistor is a collector electrode, the second electrode is an emitter electrode and the third electrode is a base electrode.

* * * * *